May 18, 1937.  B. C. PLACE  2,081,065
ADAPTING SHEET METAL ELEMENTS FOR SCREWS
Filed June 25, 1936
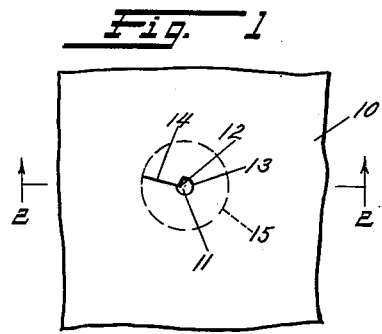
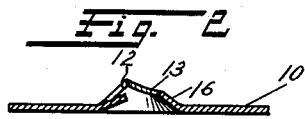
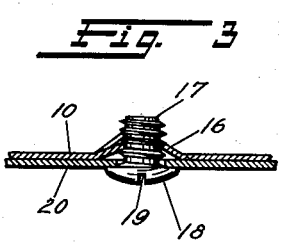
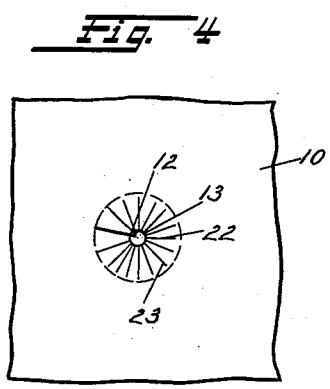
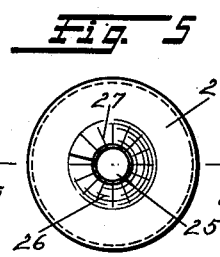
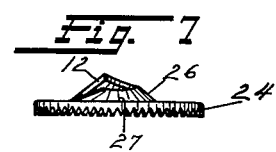
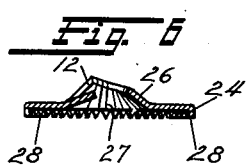
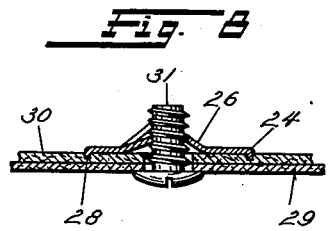
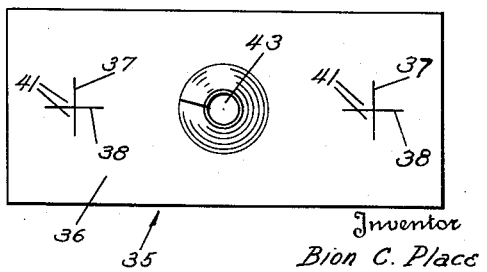
Inventor
Bion C. Place
By Strauch & Hoffman
Attorneys Patented May 18, 1937

2,081,065

UNITED STATES PATENT OFFICE 2,081,065

ADAPTING SHEET METAL ELEMENTS FOR SCREWS

Bion C. Place, Detroit, Mich.

Application June 25, 1936, Serial No. 87,292

6 Claims. (Cl. 85—32)

This invention involves an improved method and arrangement for adapting sheet metal elements for the reception of screw threaded fasteners. More particularly, the invention contemplates the provision of sheet metal elements with a self-locking thread, that is, a thread that will grip the screw and prevent reverse rotation or unscrewing thereof after the screw has been turned firmly into its holding position.

It is well known that the attachment of parts to a sheet metal structure by means of screws threaded in openings in said structure is generally unsatisfactory because the walls of the openings are of insufficient area to form enough threads therein to adequately hold the screw in the opening. Furthermore it is impracticable to really tighten the screw in such a threaded opening because if the screw is drawn tight the few shallow fine-pitch threads are stripped. Accordingly, bolts and nuts are very frequently used in securing parts to sheet metal structures. Or, the sheet metal is thickened as by applying a washer or the like designed to increase the area of the wall of the opening and thus make it practicable to increase the number of threads in said wall. The application of nuts and the provision for a wall of larger area increase the costs. Yet neither arrangement is satisfactory because generally no means are provided to prevent the unscrewing of the threaded fastener.

Furthermore, in the attachment of parts to sheet metal structure use is sometimes made of hardened screws that are formed to cut their own threads in the wall of the opening in the sheet metal. Such screws are costly to produce though the resultant structure has the disadvantage already alluded to that the fine threads are likely to be stripped.

Another arrangement employed in securing parts to fibrous material by means of screws involves the application of tempered spring metal plates, termed "spring nuts" to the material. In such constructions, the spring nuts are harder than the screws, whereas in the screw that cuts its own thread, the screws must be harder than the metal in which they engage.

One of the primary purposes of the present invention is to provide a way of threading screws in sheet metal supports, or in sheet metal devices, that will not require special treatment of either the screw or that the metal structure or device be hardened, while yet providing a vastly superior engagement between the screw and the structure or device.

Another principal purpose of the present invention is to form the wall of an opening in a sheet metal structure so as to constitute one complete thread having the thickness of the metal sheet for engagement by a screw having a pitch greater than said thickness and to form the opening and the portion of the sheet metal around said opening so that upon tightening the screw said thread is drawn snugly into contact with the screw whereby ready reverse rotation thereof is prevented.

Another object of the invention is to provide an improved method of preparing a sheet metal element for the reception of a screw and for the retention thereof after application.

Still another object of the invention is to provide a sheet metal fastening plate formed so as to provide a self-locking thread.

Further objects of the invention will appear as the description thereof proceeds with reference to the accompanying drawing in which:—

Figure 1 is a fragmental plan view of a sheet metal element provided with an opening of the kind necessary to adapt said element for the reception of a screw.

Figure 2 is a sectional view taken on the plane indicated by line 2—2 in Figure 1, and showing the element after the portion thereof adjacent the opening has been pressed into its final form.

Figure 3 is a fragmentary sectional view showing a screw applied to the element of Figure 2, said screw serving to retain covering material upon said element.

Figure 4 is a view similar to Figure 1, but showing a modification.

Figure 5 is a plan view of an element in the form of a spring nut embodying the modified form of invention.

Figure 6 is a sectional view taken on the plane indicated by line 6—6 in Figure 5.

Figure 7 is an edge view of the spring nut illustrated in Figure 5.

Figure 8 is a fragmental sectional view showing one manner in which the spring nut of Figures 5, 6 and 7 may be used.

Figure 9 is a plan view of a fastening plate constituting a modification of that shown in Figure 5 and designed for ready attachment to fibrous or like material.

Like reference characters indicate like parts throughout the several figures.

Referring to Figure 1, 10 designates a sheet metal element which may be a fragment of any sheet metallic structure to which it is desired to attach another part by means of a screw. In order to adapt said element for the reception of said screw, it is provided with an opening 11 which is of irregular outline as illustrated. A portion of the wall of said opening extends radially as indicated by the numeral 12. The remainder of the wall of said opening 13 is spiraloid in form, that is, the distance from the center of the hole increases constantly from the radius passing through portion 12 in a clockwise direction. A slit 14 extends into the body of the metallic element from the straight portion 12 as illustrated. The first step in the adaptation of the sheet metal element for the reception of a screw consists in the punching or stamping of the opening just described in the portion of the element which is intended to receive a screw. The opening 11 is made of a size substantially smaller than the minimum cross-sectional area of the screw which is subsequently to be passed therethrough, that is, when the sheet metal element is still in its normal condition this is the size of the opening 11.

To complete the adaptation of the sheet metal element for the reception of the screw, the portion between the dotted line 15 in Figure 1 and the opening is pressed out of the plane of the element into frustro-conical form, as illustrated in Figure 2, which shows the element in its final form. The result is a protuberance 16 of conical form, containing a truly circular opening in plan corresponding in size to the diameter of the screw at the bottom of the thread, and the wall of which is disposed in the form of a helix having substantially the pitch of the screw intended to be threaded into engagement with the sheet metal element. In forming the conical protuberance 16 it will be understood that the opening is enlarged to approximately the size and to the form of the minimum cross-sectional area of the screw intended to be passed therethrough. The straight wall 12 is disposed at the highest point of the helix above the plane of the sheet metal element and in threading the screw into engagement with said element the thread passes between said straight portion 12 and the lower adjacent separated portion of the element.

This is clear from a consideration of Figure 3 of the drawing, in which a screw 17 provided with a head 18, having a slot 19 designed to receive a screw driver, is used to attach covering material 20 to the metallic element 10 which in this figure constitutes a metallic supporting structure. Material 20 may be attached to the supporting structure by passing the point of the screw through the opening 11 and causing the thread to pass between the spaced portion 12 and the lower adjacent portion of the element as the screw is turned into engagement with the element 10. The pitch of the screw must exceed somewhat the thickness of the metal sheet and the edge of the opening therein thus constitutes one convolution of a cylindrical helix having approximately the pitch of the screw. The screw 17 is turned until the thread formed by the wall of the opening engages in the spiral groove of the screw spaced from the head a distance corresponding to the normal spacing of the screw receiving opening from the head of the fastener. Further rotation of the screws causes the conical protuberance 16 to be flattened, that is, moved toward the plane of the metal element 10. As the conical protuberance is flattened it will be understood that the size of the opening 11 is again constricted, and, as the rotation of the screw continues, the wall of the opening 11 is forced into frictional or biting engagement with the screw at the bottom of the groove in which said wall is engaged. The rotation of the screw can be continued with increasing engagement between the wall of the opening and the bottom of the screw until the engagement is such that the screw will be firmly held in the sheet metal elements, and any vibration of the structure will not result in reverse rotation or unscrewing of the screw. If desired, the turning of the screw can be continued until the conical protuberance is brought almost to the normal plane of the sheet metal element, or under some circumstances the portion of metal forming the protuberance may assume a camber thus enhancing the gripping effect of the sheet metallic element on the shank of the screws. If desired the conical protuberance may be so proportioned that the lower portion thereof is normally disposed only slightly above the plane of the element. When pressure is applied to the screw this portion will be drawn into firm contact with the other piece of material and lock the elements against relative movement. It will thus be seen that an engagement between the screw and the sheet metallic element is provided that is in effect self-locking. If desired, the wall of the opening may be roughened to present minute or small teeth that bite into the shank of the screw when the size of the opening is again reduced in drawing the screw taut. The sheet metal element requires no special treatment other than shaping. Ordinary metal is preferred, that is, the best holding action is secured by the use of sheet metal in customary condition, rather than by the use of tempered or like specially treated metal.

The arrangement just described may be used in any sheet metallic structure and enables the attachment of parts to said structure by means of screws that are directly threaded into the metallic structure and without the use of nuts. Furthermore, there is no likelihood of stripping the thread formed in the edge of the opening or the threads of the screw inasmuch as a screw is used having a deep thread and a pitch exceeding the thickness of the metal in which the screw is threaded.

If desired, the sheet metallic element may take the form of a sheet metal fastening plate usable like a nut. In such event the nut will constitute a self-locking nut. It may be used in the same way as an ordinary nut as will be understood by persons skilled in the art.

If desired, the modified construction illustrated in Figure 4 of the drawing may be employed. In this form of the invention the sheet metallic element 10 is provided with an opening 22 corresponding in form to the opening 11 before described. In order to increase the flexibility of the portion of the metal surrounding the opening, which portion is brought into frustro-conical shape in adapting the mechanical element for the reception of a screw, said portion is provided with a multiplicity of slits 23 radiating from the opening 22 and serving to separate said portion into a multiplicity of tongues, each of which is free to independently flex and bite or engage the shank of the screw when a screw is threaded into the opening after said portion is brought into frustro-conical shape, that is, the shape before described. In bringing this portion into said shape the ends of the tongues are disposed substantially on a helix corresponding in pitch to the pitch of the screw intended to be threaded in the opening. The ends of the tongues provided by the slits 23 may be roughened to increase the biting effect of said tongues on the screw thus enhancing the self-locking action of said tongues.

The arrangement just described may likewise be used in a sheet metal fastening plate or nut, a preferred embodiment of which is illustrated in Figures 5, 6 and 7. Referring to these figures, the plate includes a body 24 having an opening 25 initially of the same outline as the opening 11 in Figure 1, the portion of the body 24 surrounding the opening 25 being pressed out of the plane of the body 24 providing a conical protuberance 26, the said protuberance being formed so that the wall of the opening therein is disposed on a helix having a pitch corresponding substantially with the pitch of the screw for which the nut is designed. If desired, the protuberance 26 is provided with a multiplicity of slits 27 radiating from the opening 25 and serving to separate said portion into a multiplicity of tongues which flex independently and independently engage the shank of the screw when it is threaded through the opening 25 in a manner heretofore described. Preferably the margin of the body 24 is turned down around its entire periphery and provided with a multiplicity of teeth 28.

The plate or nut just described may be used in the manner illustrated in Figure 8 of the drawing in which it is used to secure covering material 29 to a support 30 of fibrous material, such as cardboard, for example, and screw 31 is used to attach the covering material 29 to said cardboard. In accomplishing this result the nut 24 is threaded on the shank of the screw and upon continued rotation thereof the nut is first drawn into contact with the fibrous material 30, the teeth 28 biting therein and preventing rotation of the nut with the screw. Further rotation of the screw results in the contraction of the opening 25 and a firm frictional engagement of the ends of the tongue formed by the slit 27 with the bottom of the screw. And as the rotation of the screw continues a substantial flattening of the protuberance 26 results. The result of the engagement of the tongues with the shank of the screw and the flattening of the protuberance 26 is that the nut is firmly locked to the screw and the screw cannot be readily disengaged from the nut. A self-locking action accordingly results from a firm turning of the screw into engagement with the nut. Of course, it will be understood that if desired the slits 27 may be omitted. A stiffer construction thus results.

A further modification is illustrated in Figure 9 of the drawing. In this form of the invention, a sheet metal fastening plate or nut 35 having an elongated body 36 is provided. At each end of body 36 a pair of right angular slits 37 and 38 intersecting at their centers are provided. The portion adjacent the point of intersection of slits 37 and 38 in Figure 9 may be pressed out of the plane of the body to form teeth 41 which are adapted to be forced into the fibrous support 30 for the purpose of securing the plate thereto. If desired, the material used for plates 35 and the nuts of Figures 5, 6 and 7 wherein tongues are formed may be made from spring metal although such an expedient is not necessary. It will, of course, be understood that any number of intersecting slits may be made without departing from the present invention and any other means, such as rivets or the like, may be used to secure the plates 35 to fibrous support 30. The opening 43 in the plate 35 preferably will assume the form of the opening shown in Figures 2 and 3, though it may assume that of Figure 5.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A sheet metal structure designed for self-locking threaded engagement by a screw, comprising a conical protuberance having an opening at its top, a slit in said protuberance for the passage of the thread of the screw, the wall of said opening being in the form of a helix and presenting a thread to said screw that is spaced at its lowest point a substantial distance above the adjacent structure, the thickness of said metal being substantially less than the pitch of said helix.

2. A sheet metal structure designed for self-locking threaded engagement by a screw, comprising a conical protuberance having an opening at its top, a slit in said protuberance for the passage of the thread of the screw, the wall of said opening being in the form of a helix and presenting a thread to said screw that is spaced at its lowest point a distance above the adjacent structure approximating the pitch of said screw, the thickness of said metal being substantially less than the pitch of said helix.

3. A sheet metal structure designed for self-locking threaded engagement by a screw, comprising a conical protuberance having an opening at its top for the screw and a diameter at its base exceeding twice the diameter of said screw, a slit in said protuberance for the passage of the thread of the screw, the wall of said opening being in the form of a helix and presenting a thread to said screw that is spaced at its lowest point a substantial distance above the adjacent structure, the thickness of said metal being substantially less than the pitch of said helix.

4. A sheet metal structure designed for self-locking threaded engagement by a screw, comprising a conical protuberance having an opening at its top, a slit in said protuberance for the passage of the thread of the screw, the wall of said opening being formed to present a thread to said screw that is spaced at its lowest point a substantial distance above the adjacent structure, and a screw threaded in said opening having a pitch substantially exceeding the thickness of said metal and a thread of sufficient width to substantially overlap said protuberance.

5. A sheet metal structure designed for self-locking threaded engagement by a screw, comprising a conical protuberance having an opening at its top, a slit in said protuberance for the passage of the thread of the screw, the wall of said opening being formed to present a thread to said screw that is spaced at its lowest point a distance above the adjacent structure approximating the pitch of said screw, and a screw threaded in said opening having a pitch substantially exceeding the thickness of said metal and a thread of sufficient width to substantially overlap said protuberance.

6. A sheet metal structure designed for self-locking threaded engagement by a screw, comprising a conical protuberance having an opening at its top for the screw and a diameter at its base exceeding twice the diameter of said screw, a slit in said protuberance for the passage of the thread of the screw, the wall of said opening being formed to present a thread to said screw that is spaced at its lowest point a substantial distance above the adjacent structure, and a screw threaded in said opening having a pitch substantially exceeding the thickness of said metal and a thread of sufficient width to substantially overlap said protuberance.

BION C. PLACE.